E. L. THOMPSON.
AUTOMATIC SPRINKLER APPARATUS.
APPLICATION FILED NOV. 8, 1913.

1,287,795. Patented Dec. 17, 1918.

WITNESSES
Jessie B. Kay
Georgina M. Lobias

INVENTOR
Everett L. Thompson
BY
Duncan & Duncan
ATTORNEYS

UNITED STATES PATENT OFFICE.

EVERETT L. THOMPSON, OF DOVER, NEW JERSEY, ASSIGNOR TO SYPHO-CHEMICAL SPRINKLER CORPORATION, OF CROTON-ON-HUDSON, NEW YORK, A CORPORATION OF NEW YORK.

AUTOMATIC SPRINKLER APPARATUS.

1,287,795.　　　　　Specification of Letters Patent.　　Patented Dec. 17, 1918.

Application filed November 8, 1913.　Serial No. 799,840.

*To all whom it may concern:*

Be it known that I, EVERETT L. THOMPSON, a citizen of the United States, and resident of Dover, Morris county, State of New Jersey, have made a certain new and useful Invention Relating to Automatic Sprinkler Apparatus, of which the following is a specification, taken in connection with the accompanying drawing, which forms part of the same.

This invention relates especially to automatic sprinkler apparatus in which the distributing system, comprising automatic sprinkler heads, hose connections or other distributing devices, is preferably provided with an upwardly extending suction pipe which together with the distributing system itself may be normally filled with water or with non-freezing aqueous extinguishing liquid for low temperature work. Under emergency conditions when the liquid is withdrawn from the distributing system and connected suction pipe a suction or decided reduction of pressure is caused in the upper portion of this suction pipe which may operate through a suitable suction connection, if desired, any desired emergency device such as an alarm device or any chemical or other fluid supply device to supply additional extinguishing fluid to the distributing system.

Figure 1:
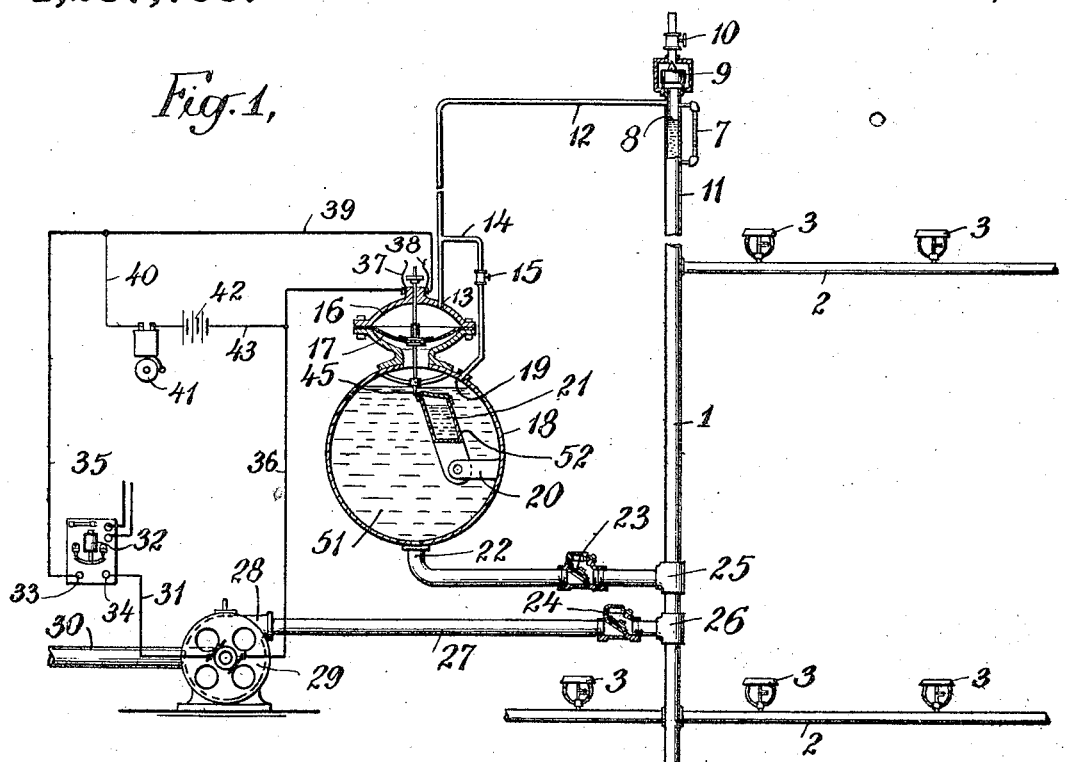
Figure 2:
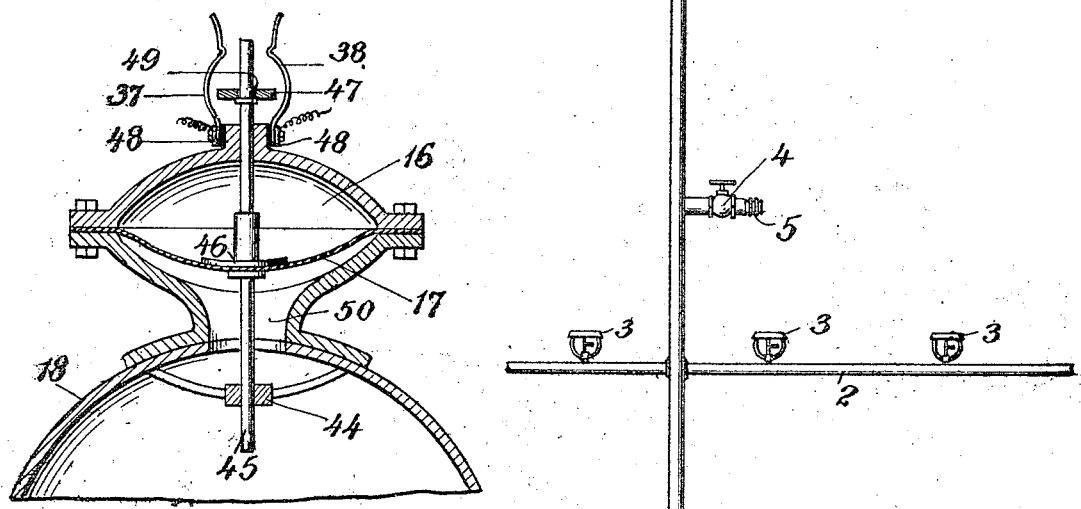

In the accompanying drawings showing in a somewhat diagrammatic way illustrative embodiments of this invention, Figure 1 is an elevation partly in section; and Fig. 2 is an enlarged vertical section of part of the same.

The distributing system may be of any desired form and may as indicated comprise one or more risers 1 connecting various distributing pipes, such as 2, on which automatic sprinkler heads or other distributing devices 3 may be arranged at suitable intervals, and the system may also comprise other distributing devices, such as hose connections 5 through which connected hose lines may be operated when the connected valves 4 and 6 are opened. The distributing system preferably comprises a suction pipe which may be formed by the upper portion of the riser 1 or other part of the distributing system together with an upward extension 11 thereof, which preferably extends a considerable distance above the upper distributing device which is likely to be used in the connected distributing system or unit thereof so as to insure the development of the desired suction, and if desired the suction pipe and accompanying pneumatic suction connection to actuate the desired alarm or other emergency device may in some cases extend above the roof of the building. An extension of ten to fifteen feet for instance above the distributing device which comes into emergency operation will produce a suction or reduction of five pounds or so below the atmospheric pressure, if as is desirable the upper portion of the suction pipe is substantially closed under emergency conditions, and this suction is ample to operate or actuate many forms of coöperating emergency or alarm devices which may be of correspondingly simplified and effective form.

The distributing system, including the suction pipe, is preferably normally filled with water or other aqueous extinguishing liquid such as a suitable solution of soluble and substantially inert salts to reduce the freezing point of the liquid for low temperature service. As shown in Fig. 1, the liquid may extend up to the point 8 in the suction pipe and for convenience of inspection, and so forth, a suitable gage glass 7 may be installed at this point, it being also desirable to provide sufficient capacity in or in connection with the upper part of the suction pipe to take care of any slight leakage in the distributing system and also to minimize the effect of temperature variations or too rapid loss of head for other causes. The expansion due to ordinary temperature changes may be readily taken care of as by the use of a reduced equalizing device normally providing a pin hole or reduced equalizing venting passage for the slow escape or ingress of air into the upper part of this substantially closed suction pipe. The equalizing valve 10 is shown in the drawing for this purpose, a needle valve at this point allowing the ready venting of air in filling the distributing system in the first place and permitting the valve to be closed to give the normal reduced vent passage desired. It is also in some cases desirable to interpose a suitable automatic closing valve at this point, such, for instance, as the float valve 9 to prevent escape of liquid during the emergency operation of the system.

Under emergency conditions when one or two of the automatic sprinkler heads open or when the other distributing devices are brought into play the extinguishing liquid in the system is instantly available for putting out the fire and the discharge of this liquid involves the withdrawal of liquid from the substantially closed suction pipe so as to cause an effective suction or pressure reduction therein. Any suitable emergency devices may be used in connection with this suction pipe for alarm purposes or to supply additional extinguishing liquid to the system or both and the suction operated emergency devices may be located at any convenient point and connected with the suction pipe in any suitable way, as for instance by suitable suction connections, preferably largely or substantially free from liquid, such as the reduced suction connection 12 indicated between the suction pipe adjacent its upper end and the suction chamber 16. This suction chamber may have a suitable suction diaphragm 17 arranged therein and connected as by the nuts or flanges 46 with a suction stem 45 guided in a bracket 44 and having if desired its upper end projecting through a suitable opening in the suction chamber. Under emergency conditions the suction diaphragm 17 is raised and may be used to actuate any suitable emergency devices, such for example, as alarm devices of any description through suitable electric contacts such as the contact springs 37, 38 which may be secured in position on the suction chamber and preferably insulated therefrom by the insulating washers 48 as shown in Fig. 2. A movable contact, such as the washer 47 may be raised by the collar 49 on the suction stem so that under emergency conditions this movable contact 47 is carried up into electrical contact with the springs 37, 38 so as to be held in that position and close the circuit between them which may as indicated comprise the wires 39, 40 and a suitable alarm device 41 in series with the battery or source of potential 42 and the return wire 43 connected to the other contact. Any similarly connected electrically operated emergency device may be used to supply supplemental extinguishing fluid to the distributing system and such an arrangement is somewhat diagrammatically shown in Fig. 1 as comprising a supplemental supply pipe 27 which may be connected with the distributing system through the connection 26 and check valve 24 so as to supply water or other extinguishing liquid when the electric motor pump 28, 29 is in operation so as to draw water from the city connection or other supply pipe 30. Any suitable electrical connections may be used to actuate such a device from the suction operated emergency device and these connections may comprise the wires 35, 36 connected with the electrical contacts 37, 38 and may also comprise the starting device or motor starter 32 connected to the motor by the connection 31 to the contact 34 while the contact 33 connects with the wire 35.

Any supplemental fluid supply for the distributing system, such as a chemically actuated supplemental fluid supply, may be used to supply additional extinguishing fluid to the distributing system under emergency conditions and such an arrangement may be used in addition to or instead of the supplemental fluid supply above referred to. Such a chemically actuated arrangement is shown in Fig. 1 as comprising a chemical supply tank 18 which may be connected with the distributing system through the connection 25 and the pipe 22 in which may be located a suitable check valve 23 preferably having a slight differential action and preventing mixture of the fluid from the chemical tank with the fluid normally in the distributing system. This fluid 51 in the tank may be any suitable carbonate solution and the supply of sulfuric or other suitable acid 21 may, if desired, be normally held within a tipping acid container 52 pivoted about the support 20 and having, if desired, a loosely arranged lead cover or cap closing its top and acting as a liquid seal at this point. If desired, the suction chamber may be provided with a support or connection 50 mounted on this chemical supply tank and the acid container may be located so that the suction stem 45 normally holds its free upper end in the position indicated, while when the suction device operates, the acid container is released and the acid can mix with the carbonate liquid so as to effect the chemical reaction which generates the high pressure within this tank and forces the extinguishing liquid out into the distributing system, this action taking place so quickly that the initiation of flow from any of the sprinkler heads or other distributing devices of the system is very quickly supplemented by the high pressure discharge caused by this chemical action which may be maintained as long as desired, depending upon the capacity of the chemical supply tank. Under some conditions it is desirable to have an equalizing connection such as 14 between the chemical supply tank 18 and the suction connection 12 or other part of the apparatus so as to take care of any slight changes in temperature, etc. Any suitable regulating valve 15 such as the well known needle valve type for fine adjustments may be used to close this equalizing connection to the desired extent so as to allow merely a slow venting action and insure the desired emergency action of the apparatus in the manner described.

This invention has been described in connection with a number of illustrative embodiments, forms, elements, materials and parts, to the details of which disclosure the invention is not of course to be limited, since what is claimed as new and what is desired to be secured by Letters Patent is set forth in the appended claims:

1. In automatic sprinkler apparatus, a distributing system comprising distributing devices including automatic sprinkler heads and a suction pipe extending upwardly beyond said distributing devices and having its upper portion substantially closed under emergency conditions, nonfreezing extinguishing liquid in said distributing system and suction pipe, a suction operated emergency device including an alarm connected to the upper portion of said suction pipe to be operated by the suction caused therein by the emergency action of said distributing devices, a coöperating chemical supply tank having a movable container charged with a supply of acid released by the action of said emergency device, and a connection between said chemical supply tank and said distributing system comprising a check valve.

2. In automatic sprinkler apparatus, a distributing system comprising distributing devices including automatic sprinkler heads and a suction pipe extending above said distributing devices and having its upper portion closed under emergency conditions, extinguishing liquid in said distributing system and suction pipe, a suction operated emergency device connected to the upper portion of said suction pipe to be operated by the suction caused therein by the emergency action of said distributing devices, a coöperating chemical supply tank having a supply of acid released by the action of said emergency device, and a connection between said chemical supply tank and said distributing system comprising a check valve.

3. In automatic sprinkler apparatus, a distributing system comprising distributing devices including automatic sprinkler heads and a suction pipe extending above said distributing devices and having its upper portion substantially closed under emergency conditions, extinguishing liquid in said distributing system and suction pipe, a suction operated emergency device connected to the upper portion of said suction pipe to be operated by the suction caused therein by the emergency action of said distributing devices and a coöperating chemical supply tank having a supply of acid released by the action of said emergency device.

4. In automatic sprinkler apparatus, a distributing system adapted to be normally charged with extinguishing liquid and comprising automatic sprinkler heads and hose distributing devices and a suction pipe extending upwardly beyond said distributing devices and having a substantially closed upper end, a reduced equalizing device in the upper portion of said suction pipe, a suction operated emergency device comprising a chemical supply tank to supply additional extinguishing liquid to said distributing system under emergency conditions and a small area suction connection between said emergency device and the upper portion of said suction pipe to actuate said emergency device by the suction created in said suction pipe on the emergency flow of liquid from said system.

5. In automatic sprinkler apparatus, a distributing system adapted to be normally charged with extinguishing liquid and comprising automatic distributing devices and a suction pipe extending upwardly beyond said distributing devices and having a substantially closed upper end, a reduced equalizing device in the upper portion of said suction pipe, a suction operated emergency device to supply additional extinguishing liquid to said distributing system under emergency conditions and a suction connection between said emergency device and the upper portion of said suction pipe to actuate said emergency device by the suction created in said suction pipe on the emergency flow of liquid from said system.

6. In automatic sprinkler apparatus, a distributing system adapted to be normally charged with extinguishing liquid and comprising automatic distributing devices and a suction pipe extending upwardly beyond said distributing devices and having a substantially closed upper end, an equalizing device in the upper portion of said suction pipe, a suction operated emergency device and a suction connection between said emergency device and the upper portion of said suction pipe to actuate said emergency device by the suction created in said suction pipe on the emergency flow of liquid from said system.

7. In automatic sprinkler apparatus, a distributing system normally charged with non-freezing extinguishing liquid and comprising automatic sprinkler heads and hose distributing devices and a suction pipe extending upwardly beyond the distributing devices and having a substantially closed upper end under emergency conditions, a reduced equalizing device in the upper portion of said suction pipe, a suction operated emergency device comprising a chemical supply tank to supply additional extinguishing liquid to said distributing system under emergency conditions and a pneumatic suction connection extending downward between the upper portion of said suction pipe and said emergency device to actuate the same by the suction created in said suction pipe on the emergency flow of liquid from said system.

8. In automatic sprinkler apparatus, a distributing system normally charged with non-freezing extinguishing liquid and comprising automatic distributing devices and a suction pipe extending upwardly beyond the distributing devices and having a substantially closed upper end under emergency conditions, a suction operated emergency device and a pneumatic suction connection extending downward between the upper portion of said suction pipe and said emergency device to actuate the same by the suction created in said suction pipe on the emergency flow of liquid from said system.

9. In automatic sprinkler apparatus, a distributing system normally charged with extinguishing liquid and comprising automatic distributing devices and a suction pipe extending upwardly beyond the distributing devices and having a substantially closed upper end under emergency conditions, a suction operated emergency device and a suction connection extending downward between the upper portion of said suction pipe and said emergency device to actuate the same by the suction created in said suction pipe on the emergency flow of liquid from said system.

10. In automatic sprinkler apparatus, a distributing system comprising distributing devices including automatic sprinkler heads, a vented suction pipe extending above said distributing devices and having its upper portion substantially closed under emergency conditions and non-freezing extinguishing liquid in said distributing system and suction pipe, and a coöperating suction actuated emergency device connected to the upper portion of said suction pipe and operating to furnish to said distributing system a supplemental supply of high pressure extinguishing liquid on the emergency action of said distributing devices.

11. In fire extinguishing apparatus, a distributing system comprising a distributing device and an upper suction portion extending above said distributing device and provided with a venting float valve automatically closing under emergency conditions, extinguishing liquid in said distributing system and suction portion, an emergency device operating under emergency conditions and an operating connection between said suction portion and said emergency device.

12. In automatic sprinkler apparatus, a distributing system comprising an upper suction portion substantially closed under emergency conditions and distributing devices including automatic sprinkler heads below said suction portion, non-freezing extinguishing liquid in said distributing system and suction portion, and a coöperating suction actuated emergency device comprising gaseous pressure liquid supply means connected to said suction portion and adapted to be actuated to furnish to said distributing system a supplemental supply of extinguishing liquid on the emergency flow of extinguishing liquid from said distributing devices.

13. In fire extinguishing apparatus, a distributing system comprising an upper vented suction portion substantially closed under emergency conditions and distributing devices below the top of said suction portion, extinguishing liquid in said distributing system and suction portion, and a coöperating suction actuated emergency device connected to said suction portion and adapted to be actuated on the emergency flow of extinguishing liquid from said distributing devices.

14. In fire extinguishing apparatus, a distributing system comprising a distributing device and an upper portion extending above said distributing device and provided with a venting device, means to automatically close said venting device on emergency discharge from said system, extinguishing liquid in said distributing system and suction portion, an emergency device operating under emergency conditions and an operating connection between said upper portion and said emergency device.

15. In automatic sprinkler apparatus, a distributing system comprising a vented suction pipe having its upper portion substantially closed under emergency conditions and distributing devices including automatic sprinkler heads below the top of said suction portion, non-freezing extinguishing liquid in said distributing system and suction pipe, and a coöperating suction actuated emergency alarm device connected to the upper portion of said suction pipe and operating to furnish to said distributing system a supplemental supply of extinguishing liquid on the emergency action of said distributing devices.

16. In automatic sprinkler apparatus, a distributing system adapted to be normally charged with extinguishing liquid and comprising automatic distributing devices and a suction pipe extending upwardly beyond said distributing devices and having a substantially closed upper end, a reduced equalizing device in the upper portion of said suction pipe, a suction operated emergency device below the upper distributing devices to supply additional extinguishing liquid to said distributing system under emergency conditions and a suction connection between said emergency device and the upper portion of said suction pipe to actuate said emergency device by the suction created in said suction pipe on the emergency flow of liquid from said system.

17. In automatic sprinkler apparatus, a distributing system normally charged with extinguishing liquid and comprising automatic distributing devices and a suction pipe extending upwardly beyond the distributing devices and having a substantially closed upper end under emergency conditions, a suction operated emergency device below the upper distributing devices and a suction connection extending downward between the upper portion of said suction pipe and said emergency device to actuate the same by the suction created in said suction pipe on the emergency flow of liquid from said system.

18. In a fire extinguishing apparatus, a distributing system normally charged with extinguishing liquid and comprising distributing devices and a suction pipe extending upwardly beyond the distributing devices, a suction operated emergency device below the upper distributing devices and a suction connection extending downward between said suction pipe and said emergency device to actuate the same by the suction created in said suction pipe on the emergency flow of liquid from said system.

19. In automatic sprinkler apparatus, a distributing system normally charged with extinguishing liquid and comprising automatic sprinkler heads and hose distributing devices and a suction pipe extending upwardly beyond the distributing devices and having a substantially closed upper end under emergency conditions, a reduced equalizing device in the upper portion of said suction pipe, a suction operated emergency device comprising a chemical supply tank below the upper distributing devices to supply additional extinguishing liquid to said distributing system under emergency conditions and a pneumatic suction connection extending downward between said suction pipe and said emergency device to actuate the same by the suction created in said suction pipe on the emergency flow of liquid from said system.

20. In fire extinguishing apparatus, a distributing system substantially charged with extinguishing liquid and comprising distributing devices and a suction pipe having its upper portion extending above said distributing devices and being substantially closed under emergency conditions, and a coöperating suction actuated emergency device below the upper distributing devices and operating on the emergency discharge of said extinguishing liquid from said distributing devices.

21. In automatic sprinkler apparatus, a distributing system comprising distributing devices including automatic sprinkler heads, a vented suction pipe having its upper portion extending above said distributing devices and being at least substantially closed under emergency conditions and extinguishing liquid in said distributing system and suction pipe, and a coöperating suction actuated chemical emergency device below the upper distributing devices and connected to the upper portion of said suction pipe and operating to furnish to said distributing system a supplemental supply of extinguishing liquid on the emergency action of said distributing devices.

22. In fire extinguishing apparatus, a distributing system comprising distributing devices, a vented suction pipe having its upper portion extending above said distributing devices and being at least substantially closed under emergency conditions and extinguishing liquid in said distributing system and suction pipe, and a coöperating suction actuated emergency device below the upper distributing devices and connected to said suction pipe and operating to furnish to said distributing system a supplemental supply of extinguishing liquid on the emergency action of said distributing devices.

23. In fire extinguishing apparatus, a distributing system comprising distributing devices and a vented suction portion extending above all of said distributing devices and having its upper portion substantially closed under emergency conditions, non-freezing extinguishing liquid in said distributing system and suction portion, a coöperating emergency fluid supply device comprising a chemical gaseous pressure supply tank below the upper distributing devices to furnish to said distributing system a supplemental supply of extinguishing liquid on the emergency action of said distributing devices and a pneumatic suction connection extending downward from said suction portion to said emergency device to effect its emergency operation.

24. In fire extinguishing apparatus, a distributing system comprising distributing devices and a suction portion extending above all of said distributing devices, non-freezing extinguishing liquid in said distributing system and suction portion, a coöperating emergency fluid supply device comprising a gaseous pressure supply tank below the upper distributing devices to furnish to said distributing system a supplemental supply of extinguishing liquid on the emergency action of said distributing devices and a pneumatic suction connection extending downward from said suction portion to said emergency device to effect its emergency operation.

25. In fire extinguishing apparatus, a distributing system comprising distributing devices and a suction portion extending above all of said distributing devices, extinguishing liquid in said distributing system and suction portion, a coöperating emergency fluid supply device below the upper distributing devices to furnish to said distributing system a supplemental supply of extinguishing liquid on the emergency action of said distributing devices and a suction connection extending downward from said suction portion to said emergency device to effect its emergency operation.

26. In automatic sprinkler apparatus, a distributing system containing extinguishing liquid and comprising distributing devices and a suction portion extending above said distributing devices and having its upper end normally at substantially atmospheric pressure and substantially closed under emergency conditions, a chemical mixing device connected to said distributing system to be operated by the suction caused therein by the emergency action of said distributing devices and a chemical pressure supply tank actuated by said mixing device and connected to said distributing system to supply additional extinguishing liquid thereto.

27. In fire extinguishing apparatus, a distributing system normally charged with extinguishing liquid and comprising a distributing device and an upper portion of said system extending above said distributing device, and normally at substantially atmospheric pressure and substantially closed under emergency conditions, a pneumatic suction connection communicating with the upper portion of said system and means comprising a chemically operated gaseous pressure supply tank and connected to said suction connection to operate by the suction caused on the discharge of liquid from said distributing system.

EVERETT L. THOMPSON.

Witnesses:
HARRY L. DUNCAN,
JOS. C. MANEELY.